US011428704B2

(12) United States Patent
Cai et al.

(10) Patent No.: US 11,428,704 B2
(45) Date of Patent: Aug. 30, 2022

(54) GENERATOR POLE SLIP DETECTION

(71) Applicant: Caterpillar Inc., Peoria, IL (US)

(72) Inventors: Zhijun Cai, Dunlap, IL (US); Yanchai Zhang, Dunlap, IL (US); Wenming Zhao, Dunlap, IL (US); Yong Sun, Dunlap, IL (US); Xuefei Hu, Dunlap, IL (US); Eric Wayne Ohlson, Edelstein, IL (US); Suresh Baddam Reddy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 413 days.

(21) Appl. No.: 16/738,097

(22) Filed: Jan. 9, 2020

(65) Prior Publication Data

US 2021/0215733 A1 Jul. 15, 2021

(51) Int. Cl.
*H02P 9/10* (2006.01)
*G01P 3/48* (2006.01)
*H02K 11/20* (2016.01)
*H02P 6/17* (2016.01)
*G01D 5/14* (2006.01)

(52) U.S. Cl.
CPC .................. *G01P 3/48* (2013.01); *G01D 5/14* (2013.01); *H02K 11/20* (2016.01); *H02P 6/17* (2016.02)

(58) Field of Classification Search
CPC .... G01D 5/34; G01D 5/14; H02P 9/10; H02P 6/17; G01P 3/48; H02K 11/20
See application file for complete search history.

(56) References Cited

U.S. PATENT DOCUMENTS

| 8,278,883 | B2 | 10/2012 | Dalby |
| 9,093,839 | B2 | 7/2015 | De Kock et al. |
| 9,395,722 | B2 | 7/2016 | Krata et al. |
| 9,594,091 | B2 | 3/2017 | Niedrist |
| 2009/0005947 | A1 | 1/2009 | Maeda |
| 2010/0039077 | A1 | 2/2010 | Dalby |
| 2013/0168960 | A1* | 7/2013 | Kalinka .................... H02P 9/10 290/7 |
| 2013/0176648 | A1 | 7/2013 | De Kock et al. |
| 2016/0187425 | A1 | 6/2016 | Fahringer |
| 2018/0076753 | A1* | 3/2018 | Donolo .................... G01D 5/34 |
| 2018/0102725 | A1 | 4/2018 | Fahringer |

FOREIGN PATENT DOCUMENTS

| CN | 105762839 B | 12/2018 |
| JP | 63069498 A | 3/1988 |
| WO | 2001017084 A1 | 3/2001 |

* cited by examiner

*Primary Examiner* — Cortez M Cook
(74) *Attorney, Agent, or Firm* — von Briesen & Roper, s.c.

(57) ABSTRACT

A system and method for protecting a genset from pole slip is disclosed. The system may comprise a generator, a prime mover and a controller. The generator includes a stator and a rotor. The prime mover is configured to drive rotation of the rotor. The controller may be configured to: determine mechanical status of the generator based on data associated with a translational displacement of the rotor; determine electrical status of the generator based on (a) a load angle or (b) the load angle and a rate of change of the load angle associated with rotation of the rotor in the stator; determine an operating condition of the generator based on fusion of the mechanical status and the electrical status; if the operating condition is a pole-slip-warning, activate an output member to display or emit a warning; and, if the operating condition is a pole-slip, activate a protective action.

20 Claims, 6 Drawing Sheets

| # | Electrical Status | Mechanical Status | Operating Condition (Flag) |
|---|---|---|---|
| 1 | electrical-no-pole-slip | mechanical-no-pole-slip | no-pole-slip |
| 2 | electrical-no-pole-slip | mechanical-pole-slip-warning | no-pole-slip |
| 3 | electrical-no-pole-slip | mechanical-pole-slip | pole-slip-warning |
| 4 | electrical-pole-slip-warning | mechanical-no-pole-slip | no-pole-slip |
| 5 | electrical-pole-slip-warning | mechanical-pole-slip-warning | pole-slip-warning |
| 6 | electrical-pole-slip-warning | mechanical-pole-slip | pole-slip |
| 7 | electrical-pole-slip | mechanical-no-pole-slip | no-pole-slip |
| 8 | electrical-pole-slip | mechanical-pole-slip-warning | pole-slip-warning |
| 9 | electrical-pole-slip | mechanical-pole-slip | pole-slip |

FIG. 6

GENERATOR POLE SLIP DETECTION

TECHNICAL FIELD

The present disclosure generally relates to a generator set (also referred to as "genset"), and more particularly, to systems for protecting generators from pole slip.

BACKGROUND

A generator set includes a generator and a prime mover. The generator is typically an electric machine, configured to convert electrical energy into rotational torque or rotational torque into electrical energy for any one of a variety of different applications including power generation, power back-up, off-shore drilling, machine tools, traction motors, industrial work machines, marine work machines, and the like. Such generator is commonly employed in association with a prime mover, such as an engine or the like. As fuel is burned within the prime mover, a mechanical rotation is created that drives the generator to produce electrical energy. More specifically, the primary power source rotates a rotor of the electric machine to cause electromagnetic interactions that generate electrical energy to be employed by one or more loads that are connected to the electric machine.

Conditions such as low excitation (e.g., excitation voltage is low), abrupt load change, or even faults in the circuits may cause the poles in the generator to become out of step, a condition often referred to in the art as "pole slip." Pole slip will cause damage to generator components and may also lead to the instability in power generation. Pole slip is difficult to distinguish from a power swing because both the power swing condition and the pole slip condition, oscillation is experienced during the initial phase as the generator transforms into the power swing condition and the pole slip condition. However, while the generator typically recovers and becomes stable once again after experiencing a power swing condition, this is often not the case with pole slip condition. In other words, after experiencing the pole slip condition, the generator may progress to and remain in an unstable condition.

U.S. Pat. No. 8,278,883, issued Oct. 2, 2012, (the '883 patent) relates to an apparatus for measuring load angle in a synchronous generator and detecting pole slip. The '883 patent describes an apparatus comprising means for sensing a waveform produced by the permanent magnet machine, means for sensing a waveform produced by the main machine, and means for comparing the waveform produced by the permanent magnet machine with the waveform produced by the main machine to produce a measure of load angle. The '883 patent further describes using the measure of the load angle to provide a warning of potential pole slip. However, pole slip usually occurs very quickly and action must also be taken quickly. While the '883 patent may be beneficial, the pole slip condition may be flagged too late (already outside the stable region or moving very quickly to outside of the stable region) or the triggering of the pole slip condition may rely too much on predictive estimation using the load angle. A better system is needed.

SUMMARY OF THE DISCLOSURE

In one aspect of the present disclosure, a system for detecting a pole-slip condition in a generator of a genset is provided. The system comprises the generator, a prime mover and a controller. The generator may include a stator and a rotor rotatably disposed within the stator. The generator may be configured to rotate a rotor magnetic field in the stator and to generate a stator magnetic field when the stator is electrically coupled to a load. The prime mover may include an output shaft operably connected to the rotor of the generator. The prime mover is configured to drive rotation of the rotor. The controller is in operable communication with the genset. The controller may be configured to: determine a mechanical status of the generator based on data associated with a translational displacement of the rotor; determine an electrical status of the generator based on (a) a load angle or (b) the load angle and a rate of change of the load angle associated with rotation of the rotor in the stator; determine an operating condition of the generator based on fusion of the mechanical status and the electrical status; if the operating condition is a pole-slip-warning, activate an output member to display or emit a warning; and, if the operating condition is a pole-slip, activate a protective action.

In another aspect of the disclosure, a method for protecting a genset from pole slip is disclosed. The genset comprises a prime mover and a generator. The prime mover may include an output shaft operably connected to a rotor of the generator. The prime mover may be configured to drive rotation of the rotor. The generator includes a stator and a rotor rotatably disposed within the stator. The stator is electrically coupled to a load. The generator may be configured to rotate a rotor magnetic field in the stator and to generate a stator magnetic field. The method may comprise: determining, by a controller in operable communication with the genset, a mechanical status of the generator based on data associated with translational displacement of the rotor; calculating, by the controller, a load angle and a rate of change of the load angle associated with rotation of the rotor in the stator; determining, by the controller, an electrical status of the generator based on (a) the load angle or (b) the load angle and the rate of change of the load angle; determining, by the controller, an operating condition of the generator based on fusion of the mechanical status and the electrical status; if the operating condition is a pole-slip-warning, activating, by the controller, an output member to display or emit a warning; and, if the operating condition is a pole-slip, activating, by the controller, a protective action.

In yet another aspect of the disclosure, a system is provided. The system comprises a genset and a controller. The genset includes a generator and a prime mover. The generator includes a stator and a rotor rotatably disposed within the stator. The generator may be configured to rotate a rotor magnetic field in the stator and to generate a stator magnetic field when the stator is electrically coupled to a load. The prime mover may include an output shaft operably connected to the rotor of the generator. The prime mover may be configured to drive rotation of the rotor. The controller is in operable communication with the genset. The controller may be configured to: calculate a resultant displacement based on data associated with a translational displacement of the rotor; determine a mechanical status of the generator based on the resultant displacement; calculate a load angle and a rate of change of the load angle associated with rotation of the rotor in the stator; determine an electrical status of the generator based on (a) the load angle or (b) the load angle and the rate of change of the load angle; determine an operating condition of the generator based on fusion of the mechanical status and the electrical status; if the operating condition is a pole-slip-warning, activate an output member to display or emit a warning; and, if the operating condition is a pole-slip, activate a protective action.

BRIEF DESCRIPTION OF THE DRAWINGS

FIG. 6 illustrates a table showing an exemplary fusion, according to the present disclosure.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

As discussed earlier, pole slip is difficult to distinguish from a power swing because oscillation is experienced during the initial phase in both pole slip and power swing. However, while the generator typically recovers and becomes stable once again after experiencing a power swing, this is often not the case with pole slip. With pole slip the generator may progress to and remain in an unstable condition. Because pole slip happens quickly, action must be taken quickly to mitigate adverse effects. If detected too late, damage to the generator may occur before the generator is shut down or isolated. However, if power swing is inaccurately predicted to be pole-slip, unnecessary disruption of power generation may be experienced.

Figure 1:
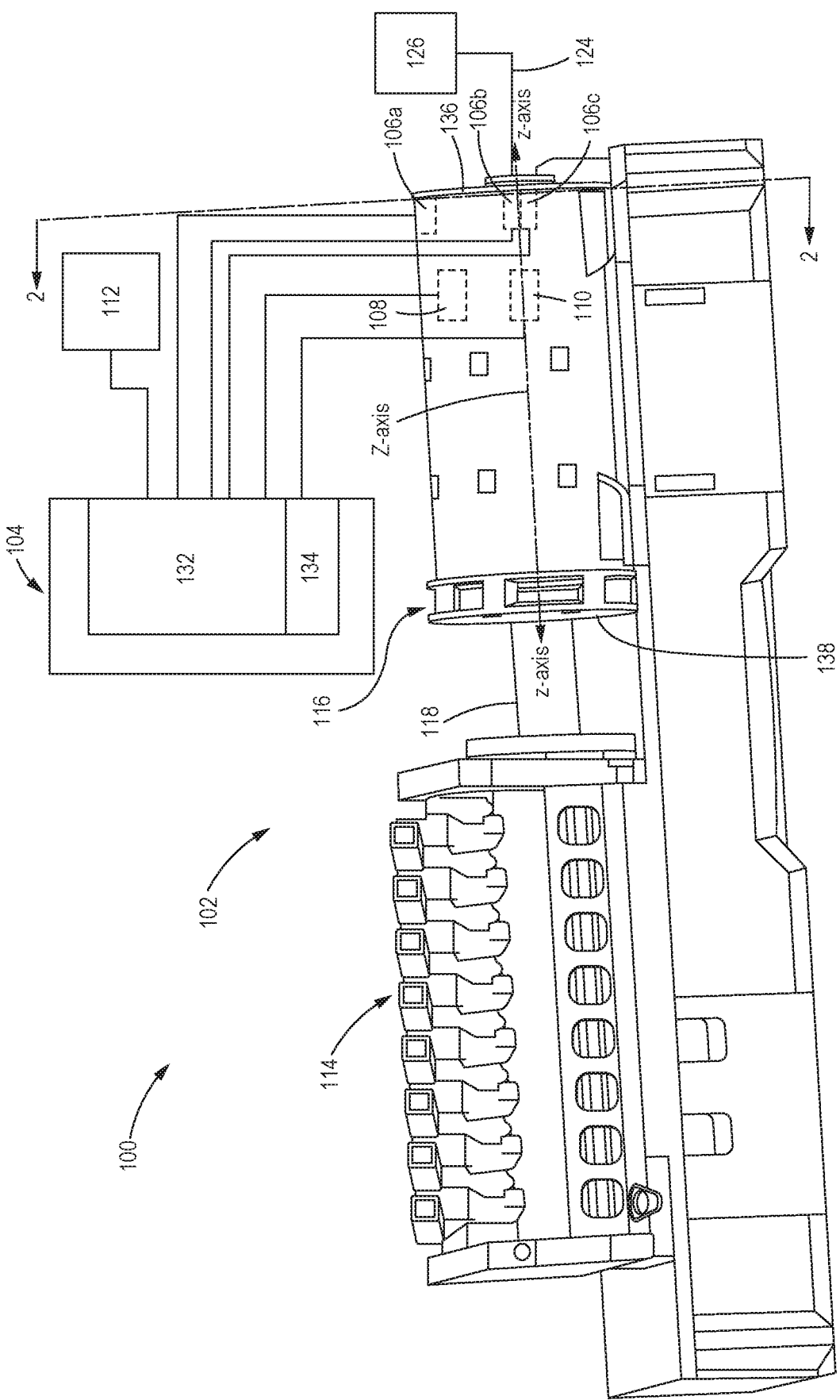
FIG. 1 is a diagrammatic view of an exemplary system, according to the present disclosure.

The system and method disclosed herein protect a genset from adverse effects of pole slip while minimizing the likelihood of characterizing a power swing as pole-slip by determining the operating condition based on a fusion of (a) mechanical characteristics related to vibration and (b) electrical characteristics. FIG. 1 illustrates one example of such a system 100. The system 100 may include a genset 102 and a controller 104. The system 100 may further include one or more displacement sensors 106, a voltage sensor 108 and a current sensor 110. The system 100 may further include an output member 112.

The genset 102 includes a prime mover 114 and a generator 116 coupled to the prime mover 114. The prime mover 114 includes an output shaft 118. For example, the prime mover 114 may be an internal combustion engine having an output shaft 118 or any other comparable power source suitable for outputting mechanical energy, such as rotational torque, at the output shaft 118 thereof. As fuel is burned within the prime mover 114, mechanical energy in the form of rotation is created at the output shaft 118 that drives the generator 116 to produce electrical energy.

The generator 116 may be an electric machine such as an AC synchronous generator, AC induction machine, a switched reluctance machine, or other comparable type of electric machine configured to convert electrical energy into rotational torque or rotational torque into electrical energy for any one of a variety of different applications including power generation, back-up power, off-shore drilling, machine tools, traction motors, industrial work machines, marine work machines, or the like.

Figure 2:
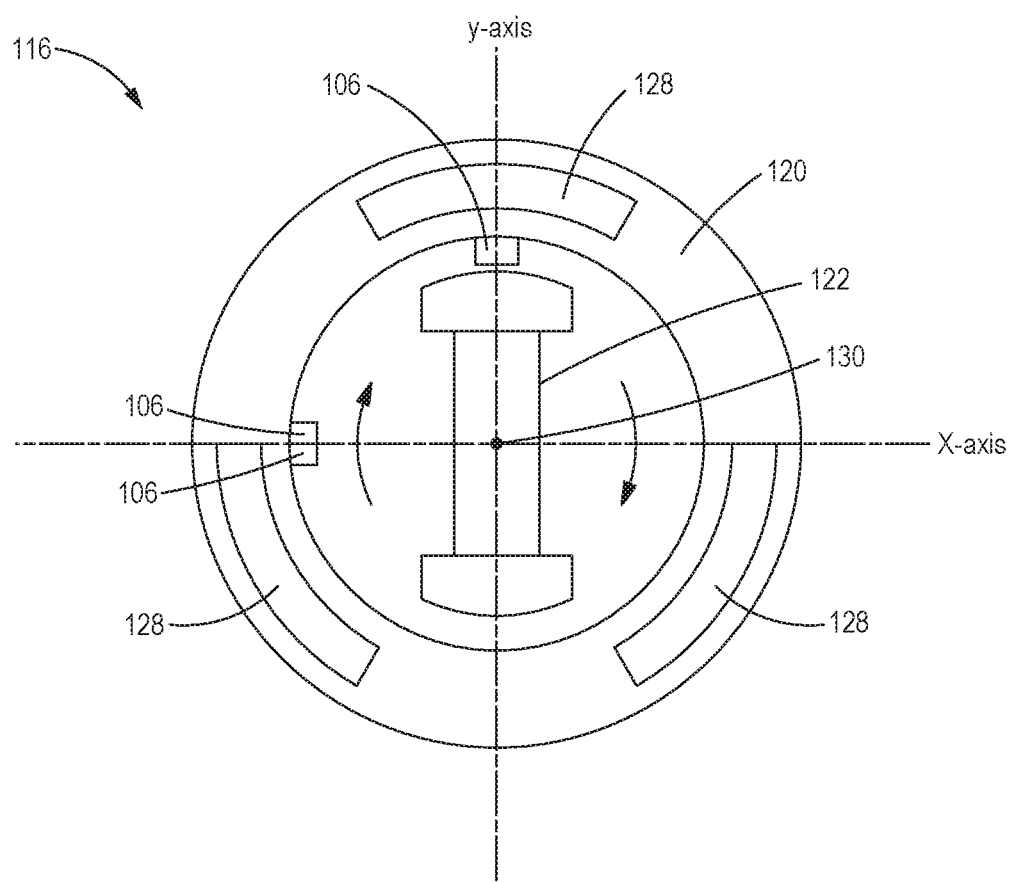
FIG. 2 is a schematic view of a cross section of the genset of FIG. 1 taken along the lines of 2-2.

FIG. 2 is a schematic view of a cross section of the genset 102 of FIG. 1 taken along the lines of 2-2. As shown in FIG. 2, the generator 116 includes a stator 120 and a rotor 122 rotatably disposed within the stator 120. The rotor 122 is operably connected to the output shaft 118 (see FIG. 1) of the prime mover 114. The stator 120 (shown in FIG. 2) may be electrically coupled to a bus 124 (as seen in FIG. 1) for providing electrical power to one or more loads 126 connected to the bus 124.

Figure 5:
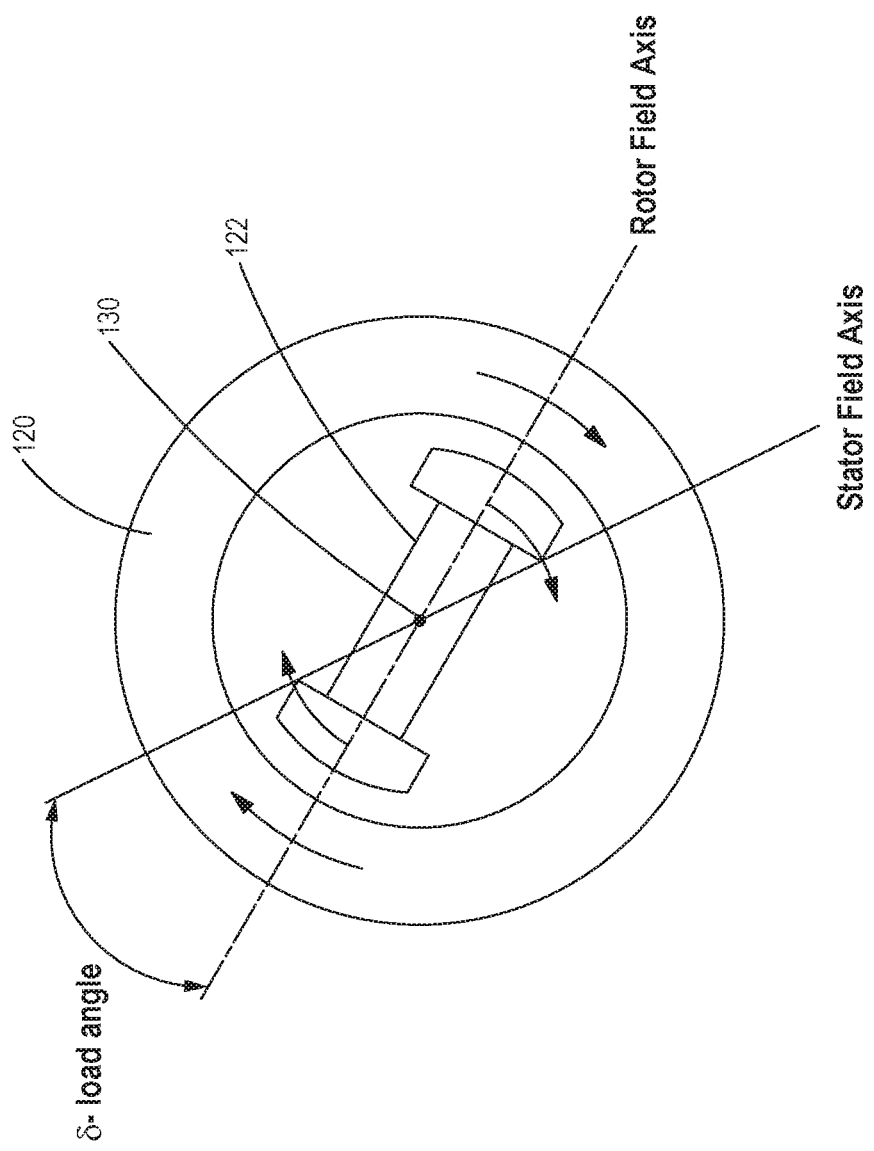
FIG. 5 is a diagrammatic illustration of an exemplary load angle.

When the genset 102 is operating in a power generation mode, the rotor 122 (see FIG. 2) electromagnetically interacts with the stator 120 such that mechanical or rotational input at the rotor 122 (e.g., received from the output shaft 118 of the prime mover 114 shown in FIG. 1) drives rotation of the rotor 122 (FIG. 2), which causes electromagnetic interactions that generate electrical energy at an output of the stator 120 (to be employed by one or more of the connected loads 126). For example, in one embodiment, a DC current is applied to windings (not shown) disposed on the rotor 122 (herein such windings referred to as "rotor windings") producing a "rotor magnetic field". Rotation of the rotor 122 rotates the rotor magnetic field relative to windings in the stator 120 (herein such windings referred to as "stator windings" 128), which induces three-phase voltage within the stator windings 128. When a load 126 (see FIG. 1) is connected to the stator 120 (FIG. 2) of the generator 116, current starts flowing in the stator windings 128, which creates a magnetic field in stator 120 (a "stator magnetic field"). The load angle δ, as is known in the art, is the rotational angle between the rotor magnetic field and the stator magnetic field created in the stator 120 for a synchronized field (both the rotor magnetic field and the stator magnetic field are rotating at synchronous speed). The load angle δ is known to increase with increasing loads 126. In FIG. 5 the load angle δ can be seen between the rotor field axis and the stator field axis.

Each of the one or more displacement sensors 106 is in operable communication with the controller 104. Each displacement sensor 106 is configured to measure data associated with translational displacement of the rotor 122. Translational displacement includes horizontal displacement of the rotor 122 along the x-axis, and/or vertical displacement of the rotor 122 along the y-axis, and/or displacement of the rotor 122 along the z-axis. For example, in an embodiment, horizontal displacement may represent (translational) movement along the x-axis of the rotor 122 from a center of rotation 130 of the rotor 122, and vertical displacement may represent (translational) movement along the y-axis of the rotor 122 from a center of rotation 130 of the rotor 122.

In the exemplary embodiment shown in FIG. 1, a displacement sensor 106a is disposed on the rear end 136 of the generator 116 in a location suitable for the displacement sensor 106a to measure data associated with (or representative of) the horizontal (translational) displacement of the rotor 122 along the x-axis. In one exemplary embodiment, the displacement sensor 106a may be disposed on the stator 120 at the rear end 136 of the generator 116 at about the twelve o'clock position, although other positions proximal to the rear end 136 may also be utilized. In the exemplary embodiment shown in FIG. 1, a displacement sensor 106b may also be disposed on the rear end 136 of the generator 116 in a location suitable for the vertical displacement sensor 106b to measure data associated with (or representative of) vertical (translational) displacement of the rotor 122 along the y-axis. In one exemplary embodiment, the displacement sensor 106b may be disposed on the rear end 136 of the stator 120 of the generator 116 at about the nine o'clock position, although other positions proximal to the rear end 136 may also be utilized. In the exemplary embodiment shown in FIG. 1, a displacement sensor 106c may be disposed on the rear end 136 of the generator 116 in a location suitable for the displacement sensor 106c to measure data associated with (or representative of) displacement of the rotor 122 along the z-axis. In one embodiment, the displacement sensor 106c may be disposed on the rear end 136 of the stator 120 of the generator 116 at about the nine o'clock, although other positions proximal to the rear end 136 may also be utilized.

Figure 4:
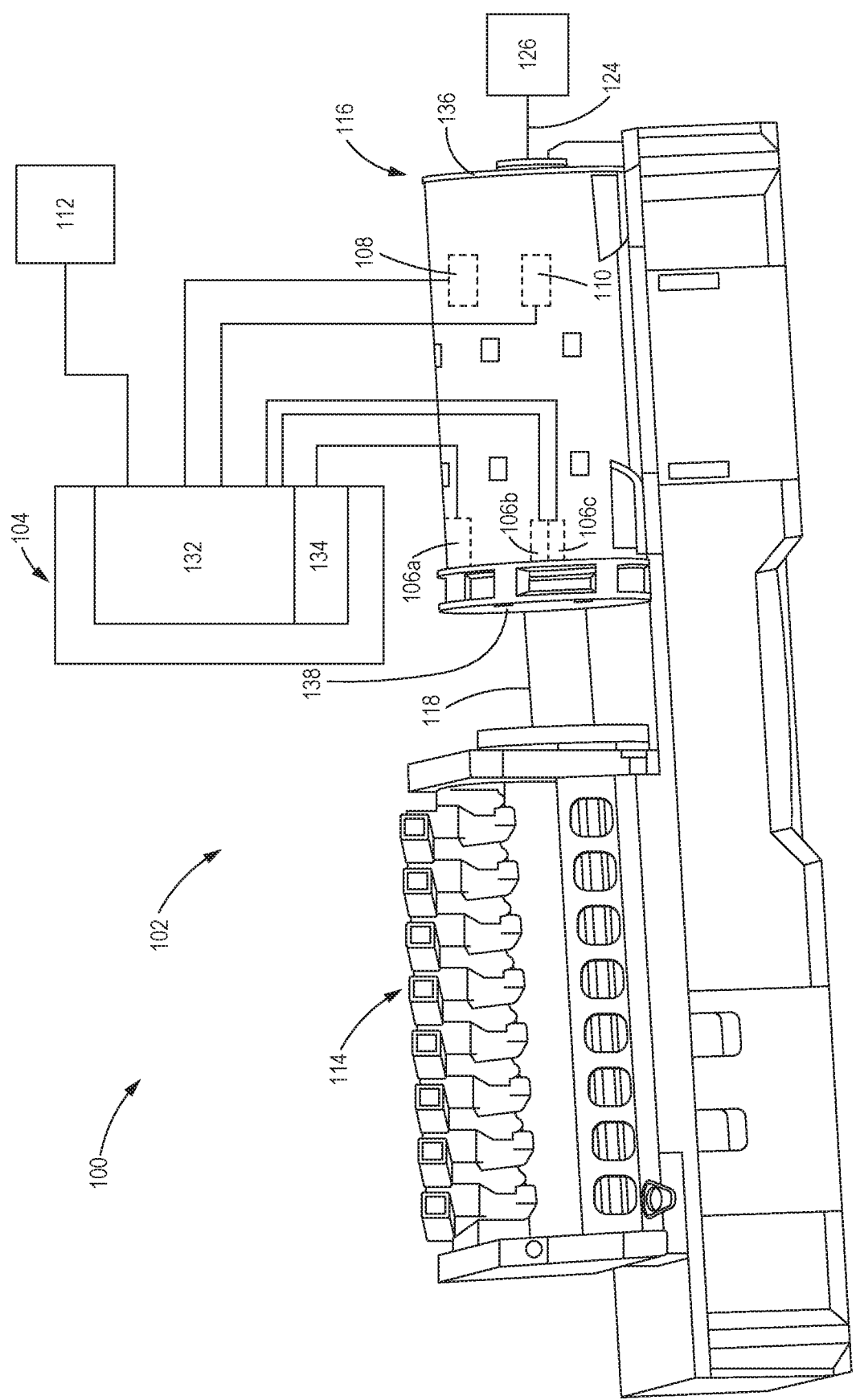
FIG. 4 is a diagrammatic view of another exemplary system, according to the present disclosure.

Alternatively, the one or more displacement sensors 106 may be disposed at the front end 138 of the generator 116. For example, as shown in the exemplary embodiment of FIG. 4, a displacement sensor 106a may be disposed on the front end 138 of the generator 116 in a location suitable for the displacement sensor 106a to measure data associated with (or representative of) the horizontal (translational) displacement of the rotor 122 along the x-axis. In the embodiment of FIG. 4, the exemplary displacement sensor 106a may be disposed on the front end 138 of the generator 116 at about the twelve o'clock position, although other positions proximal to the front end 138 may also be utilized. In the exemplary embodiment shown in FIG. 4, a displacement sensor 106b may be disposed on the front end 138 of the generator 116 in a location suitable for the displacement sensor 106b to measure data associated with (or representative of) vertical (translational) displacement of the rotor 122 along the y-axis. In one exemplary embodiment, the displacement sensor 106b may be disposed on the front end 138 of the generator 116 at about the nine o'clock position, although other positions proximal to the front end 138 may also be utilized. In the exemplary embodiment shown in FIG. 4, a displacement sensor 106c may be disposed on the front end 138 of the generator 116 in a location suitable for the displacement sensor 106c to measure data associated with (or representative of) displacement of the rotor 122 along the z-axis. In one embodiment, the displacement sensor 106c may be disposed on the front end 138 of the generator 116 at about the nine o'clock, although other positions proximal to the front end 138 may also be utilized.

In some embodiments, the data obtained by individual displacement sensors 106a, 106b, 106c described above may be provided by a (single) displacement sensor 106 such as an accelerometer, or the like, which measures data (e.g., acceleration data) associated with the displacement of the rotor 122 and from which horizontal (translational) displacement of the rotor 122 along the x-axis, vertical (translational) displacement of the rotor 122 along the y-axis, and, optionally, (translational) displacement of the rotor 122 along the z-axis may be calculated by integrating the measured acceleration. A displacement sensor 106 such as an accelerometer, or the like, may be disposed in any one of the locations described above for the displacement sensors 106 that measure data associated with translational movement along an individual axis (x, y, z). For example, a displacement sensor 106 such as an accelerometer may be disposed on the stator 120 at the rear end 136 of the generator 116.

The voltage sensor 108 may be operatively connected to the generator 116 to measure three-phase AC voltage in the stator windings 128. The voltage sensor 108 may be any voltage meter or combination of voltage meters known in the art to measure three-phase AC voltage. The voltage sensor 108 is in operable communication with the controller 104.

The current sensor 110 may be operatively connected to the generator 116 to measure the current flowing in the stator windings 128 (e.g., when a load 126 is connected) or, alternatively, to obtain data representative of the current flowing in the stator windings 128 (e.g., when a load 126 is connected). The current sensor 110 may be any current meter or combination of current meters known in the art for measuring current in a three-phase power system. The current sensor 110 is in operable communication with the controller 104.

The controller 104 may include a processor 132 and a memory component 134. The controller 104 is in operable communication with the genset 102, more specifically with the prime mover 114 and the generator 116 of the genset 102. The controller 104 may also be in operable communication with the displacement sensor(s) 106, the voltage sensor 108, the current sensor 110, the output member 112, and the bus 124. The controller 104 is configured to receive data associated with (or representative of) translational displacement of the rotor 122 and to calculate the resultant (aggregate) displacement of the rotor 122. Such translational displacement includes horizontal (translational) displacement of the rotor 122 along the x-axis, and/or vertical (translational) displacement along the y-axis and/or spatial (translational) displacement along the z-axis. The controller 104 is further configured to receive electrical data associated with rotation of the rotor 122 in the stator 120 and to calculate a load angle and a rate of change of the load angle based on the electrical data. For example, the controller 104 is configured to receive voltage data from the voltage sensor 108, and current data from the current sensor 110.

The controller 104 is also configured to determine a mechanical status of the generator 116 based on the data associated with translational displacement of the rotor 122. As used herein, the term "mechanical status" refers to a condition of the generator 116 related to pole slip that is determined based on translational displacement of the rotor 122 due to vibration (of the rotor 122). In the exemplary embodiment, mechanical status may be one of following three conditions: (1) pole slip is not presently occurring (referred to herein for mechanical status as "mechanical-no-pole-slip"); (2) generator 116 may be progressing toward pole slip (referred to herein for mechanical status as "mechanical-pole-slip-warning"); or (3) pole slip is occurring (referred to herein for mechanical status as "mechanical-pole-slip").

The controller 104 is further configured to determine an electrical status of the generator 116 based on (a) the load angle δ or (b) the load angle δ and the rate of change of the load angle δ. As used herein, the term "electrical status" refers to a condition of the generator 116 related to pole slip that is determined based on either (a) the load angle δ or (b) the load angle δ and the rate of change of the load angle δ. In the exemplary embodiment, electrical status may be one of the following three conditions: (1) pole slip is not presently occurring (referred to herein for electrical status as "electrical-no-pole slip"); (2) generator 116 may be progressing toward pole slip (referred to herein as for electrical status as "electrical pole-slip-warning"); or (3) pole slip is occurring (referred to herein for electrical status as "electrical-pole-slip"). The table below illustrates an exemplary embodiment of the determination of the electrical status according to the method herein. As the thresholds for the load angle δ and rate of change of the load angle δ will differ between different sizes of generators, the values in the table below are exemplary.

| Electrical Status | Load Angle δ in degrees | Rate of Change of Load Angle |
|---|---|---|
| electrical-pole slip | 30 < δ ≤ 150 | rate of change of load angle > change rate threshold |
| electrical-no-pole slip | δ ≤ 30 | — |
| electrical pole-slip-warning | 30 < δ ≤ 150 | rate of change of load angle ≤ change rate threshold |
| electrical-pole-slip | 150 < δ | — |

The controller 104 is further configured to determine an operating condition of the generator 116 of the genset 102 based on fusion of the mechanical status and the electrical status, as described later herein. The controller 104 is further configured to activate the output member 112 to display or emit a warning if the operating condition is determined to be a "pole-slip-warning" condition or a "pole-slip" condition. The controller 104 is further configured to activate a protection action if the operating condition is a pole-slip condition. An exemplary protective action that the controller 104 may activate may be shutting down generator 116 or the genset 102, or isolating the generator 116 from the load 126.

The processor 132 may be a microcontroller, a digital signal processor (DSP), an electronic control module (ECM), an electronic control unit (ECU), a microprocessor or any other suitable processor 132 as known in the art. The processor 132 may execute instructions and generate control signals for calculating the resultant displacement of the rotor 122 based on data associated with translational displacement of the rotor 122, for calculating the load angle δ and the rate of change of the load angle δ based on the electrical data, for determining a mechanical status of the generator 116 based on resultant displacement, for determining an electrical status of the generator 116 based on (a) the load angle δ or (b) the load angle δ and the rate of change of the load angle δ, for determining the operating condition of the generator 116 of the genset 102 based on fusing the mechanical status and the electrical status, for activating the output member 112 to display or emit a warning if the operating condition is determined to be a "pole-slip-warning" condition or a "pole-slip" condition and for initiating a preventative measure or a curative measure. Such instructions may be read into or incorporated into a computer readable medium, such as the memory component 134 or provided external to the processor 132. In alternative embodiments, hard wired circuitry may be used in place of, or in combination with, software instructions to implement a control method.

The term "computer readable medium" as used herein refers to any non-transitory medium or combination of media that participates in providing instructions to the processor 132 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 104 is not limited to one processor 132 and memory component 134. The controller 104 may include several processors 132 and memory components 134. In an embodiment, the processors 132 may be parallel processors that have access to a shared memory component(s) 134. In another embodiment, the processors 132 may be part of a distributed computing system in which a processor 132 (and its associated memory component 134) may be located remotely from one or more other processor(s) 132 (and associated memory components 134) that are part of the distributed computing system.

The controller 104 may also be configured to retrieve from the memory component 134 and formulas and other data necessary for the calculations discussed herein.

An output member 112 may be operably connected to, or in communication with, the controller 104. The output member 112 may include, but is not limited to, a visual display, a log, a horn, flashing lights, buzzer or the like. The controller 104 may also be configured to transmit to the output member 112 alarm notifications, warnings, and the like, related to operating conditions of the generator 116 of the genset 102.

Also disclosed is a method for protecting the genset 102 from pole slip. The method may comprise: determining, by a controller 104 in operable communication with the genset 102, a mechanical status of the generator 116 based on data associated with translational displacement of the rotor 122; calculating, by the controller 104, a load angle δ and a rate of change of the load angle δ associated with rotation of the rotor 122 in the stator 120; determining, by the controller 104, an electrical status of the generator 116 based on (a) the load angle δ or (b) the load angle δ and the rate of change of the load angle δ; determining, by the controller 104, an operating condition of the generator 116 based on fusion of the mechanical status and the electrical status; if the operating condition is a pole-slip-warning, activating, by the controller 104, an output member 112 to display or emit a warning; and, if the operating condition is a pole-slip, activating, by the controller 104, a protective action.

INDUSTRIAL APPLICABILITY

Figure 3:
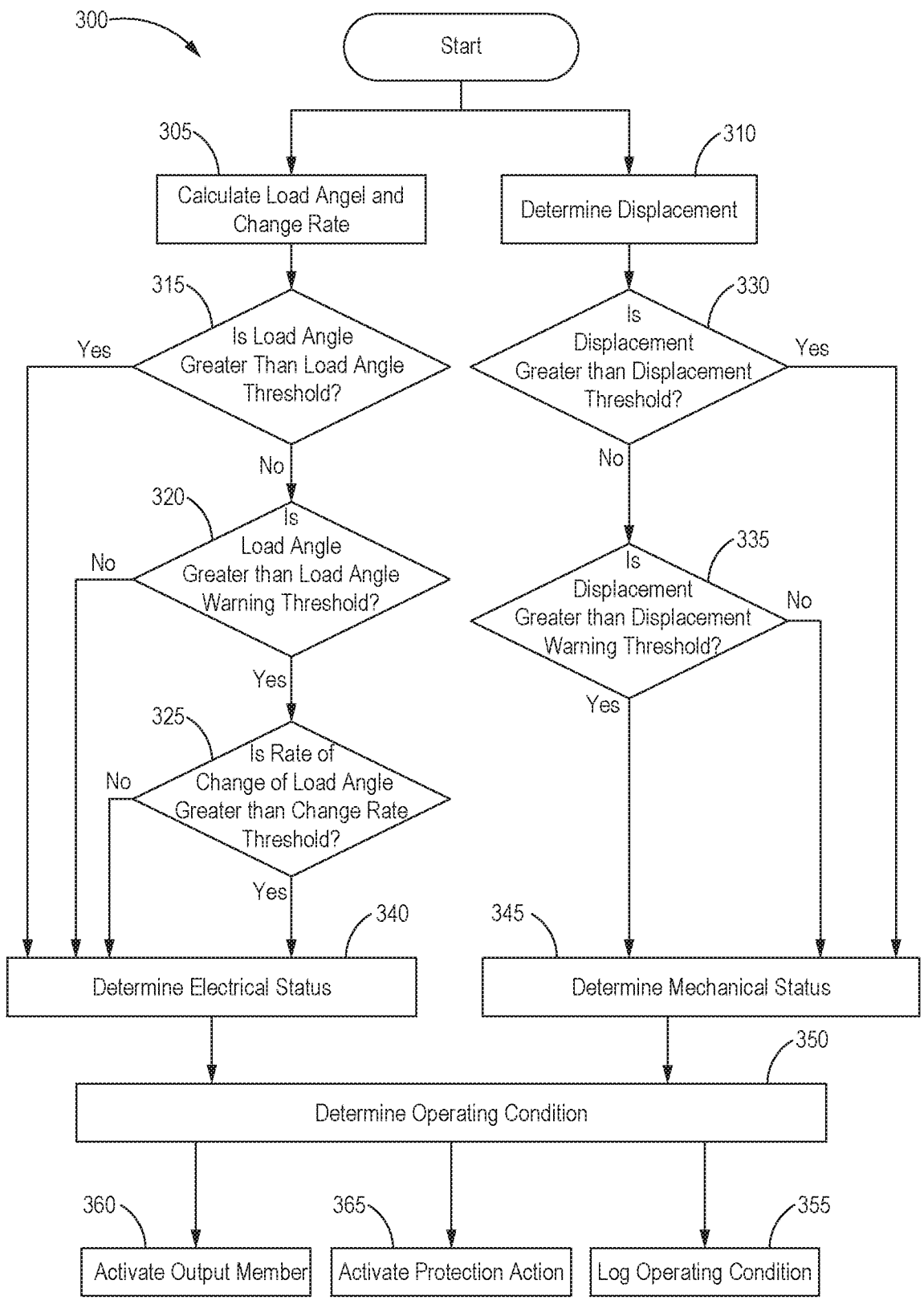
FIG. 3 is a flow diagram of one exemplary method of detecting pole slip in a genset, according to the present disclosure.

In operation, the controller 104 may be configured to operate according to a predetermined method 300, as shown for example in FIG. 3. FIG. 3 is an exemplary flowchart describing a method 300 for protecting a genset 102 from pole slip.

In block 305, the controller 104 receives electrical data associated with the rotation of the rotor 122 in the stator 120. Such electrical data includes the three-phase voltage of the stator windings 128 (received from the voltage sensor 108) and three-phase current measurement from the current sensor 110. The controller 104 calculates the load angle δ (degree) and the rate of change of the load angle δ using any suitable method known in the art.

In block 310, the controller 104 receives data associated with translational displacement of the rotor 122. Such translational displacement includes horizontal (translational) displacement of the rotor 122 along the x-axis, and/or vertical (translational) displacement of the rotor 122 along the y-axis, and/or spatial (translational) displacement of the rotor 122 along the z-axis. Such data may either be received from an accelerometer utilized as a "multi-axis" displacement sensor 106 or from a plurality of "single-axis" displacement sensors 106. In an embodiment, the controller 104 calculates a resultant (aggregate) displacement based on the data associated with the translational displacement of the rotor 122. The process proceeds to block 330.

In block 315, the controller 104 determines whether the load angle δ is greater than a load angle threshold. If the load angle δ is greater than a load angle threshold, the controller 104 proceeds to block 340 to determine that the electrical status of the generator 116 is that of electrical-pole-slip. For example, in one exemplary embodiment, the load angle threshold may be set to a predetermined number of degrees (e.g., 150 degrees). If the load angle δ is greater than such predetermined number of degrees in that exemplary embodiment, the controller 104 determines that the electrical status of the generator 116 is transformed into a electrical-pole-slip condition. If the load angle δ is less than or equal to the load angle threshold, the controller 104 proceeds to block 320.

In block 320, the controller 104 determines whether the load angle δ is greater than a load angle warning threshold. If the load angle δ is less than or equal to the load angle warning threshold, the controller 104 proceeds to block 340 and determines that the electrical status of the generator 116 is that of electrical-no-pole-slip. If the load angle δ is greater than a load angle warning threshold, the controller 104 proceeds to block 325. For example, in one exemplary embodiment, the load angle warning threshold may be set to another predetermined number of degrees (e.g., 30 degrees). If the load angle δ is greater than such predetermined number of degrees, the controller 104 will proceed to block 325.

In block 325, the controller 104 determines whether the rate of change of the load angle δ is greater than the change rate threshold. If the rate of change of the load angle δ is less than or equal to the change rate threshold, the controller 104 proceeds to block 340 and determines that the electrical status of the generator 116 is that of electrical-pole-slip-warning. If the rate of change of the load angle δ is greater than the change rate threshold, the controller 104 determines that the electrical status of the generator 116 is that of electrical-pole-slip.

In block 330, the controller 104 determines whether the resultant displacement is greater than a displacement threshold. If the resultant displacement (aggregate displacement) is greater than a displacement threshold, the controller 104 proceeds to block 345 and determines that the mechanical status of the generator 116 is that of mechanical-pole-slip. For example, in one exemplary embodiment, the displacement threshold may be set to a predetermined value (e.g., 4 millimeters (mm)). If the resultant displacement is greater than such predetermined value, the controller 104 determines that the mechanical status is that of mechanical-pole-slip. If the resultant displacement is less than or equal to the threshold, the process proceeds to block 335.

In block 335, the controller 104 determines if the resultant displacement is greater than a displacement warning threshold. If the resultant displacement is greater than a displacement warning threshold, the controller 104 proceeds to block 345 and determines that the mechanical status of the generator 116 is that of mechanical-pole-slip-warning. If the resultant displacement is less than or equal to a displacement warning threshold, the controller 104 proceeds to block 345 and determines that the mechanical status of the generator 116 is that of mechanical-no-pole-slip. For example, in one exemplary embodiment, the displacement warning threshold may be set to a predetermined value (e.g., 2 mm). If the resultant displacement is greater than such predetermined value, the controller 104 determines that the mechanical status is that of mechanical-pole-slip-warning, otherwise the controller 104 determines that the mechanical status is that of mechanical-no-pole-slip. Typically, a value is selected for the displacement warning threshold that is about or slightly less than the lowest resultant displacement value that a power swing will induce but less than the lowest value of resultant displacement that a pole slip will induce for that generator 116.

In block 350, the controller 104 determines an operating condition for the generator 116 of the genset 102 based on fusing (fusion of) the mechanical status (of the generator 116) and the electrical status (or the generator 116). A used herein the term fusion or fusing refers to the use of the mechanical status and the electrical status as inputs to determine a resulting operating condition for the generator 116. In some embodiments, the controller 104 may utilize a look up table or hash table, or other structure to fuse the mechanical status and the electrical status.

In one exemplary embodiment, the following logic illustrates an exemplary fusion of the mechanical status of the generator 116 and the electrical status of the generator 116 to determine a resulting operating condition for the generator 116 of the genset 102. FIG. 5 illustrates the results of this exemplary fusion of the mechanical status of the generator 116 and the electrical status of the generator 116 to determine a resulting operating condition for the generator 116.

If the mechanical status is mechanical-no-pole-slip and the electrical status is electrical-no-pole-slip, the controller 104 determines that the operating condition is no-pole-slip and sets a flag indicative of such operating condition.

If the mechanical status is mechanical-pole-slip-warning and the electrical status is electrical-no-pole-slip, the controller 104 determines that the operating condition is no-pole-slip and sets a flag indicative of such operating condition.

If the mechanical status is mechanical-pole-slip and the electrical status is electrical-no-pole-slip, the controller 104 determines that the operating condition is pole-slip-warning and sets a flag indicative of such operating condition.

If the mechanical status is mechanical-no-pole-slip and the electrical status is electrical-pole-slip-warning, the controller 104 determines that the operating condition is no-pole-slip and sets a flag indicative of such operating condition.

If the mechanical status is mechanical-pole-slip-warning and the electrical status is electrical-pole-slip-warning, the controller 104 determines that the operating condition is pole-slip-warning and sets a flag indicative of such operating condition.

If the mechanical status is mechanical-pole-slip and the electrical status is electrical-pole-slip-warning, the controller 104 determines that the operating condition is pole-slip and sets a flag indicative of such operating condition.

If the mechanical status is mechanical-no-pole-slip and the electrical status is electrical-pole-slip, the controller 104 determines that the operating condition is no-pole-slip and sets a flag indicative of such operating condition.

If the mechanical status is mechanical-pole-slip-warning and the electrical status is electrical-pole-slip, the controller 104 determines that the operating condition is pole-slip-warning and sets a flag indicative of such operating condition.

If the mechanical status is mechanical-pole-slip and the electrical status is electrical-pole-slip, the controller 104 determines that the operating condition is pole-slip and sets a flag indicative of such operating condition.

In block 355, the controller 104 logs the operating condition in the memory component 134 when the operating condition is determined to be pole-slip-warning or pole-slip.

In block 360, when the operating condition is determined to be pole-slip-warning or pole-slip, the controller 104 activates the output member 112 to display a warning and/or emit (e.g., flashing lights, audible sound) a warning that the generator 116 of the genset 102 may be close to experiencing pole slip or may be experiencing pole-slip.

In block 365, the controller 104 activates a protective action. The protective action may be shutting down the genset 102 or the generator 116, or isolating (via a breaker or the like) the genset 102 or the generator 116 from the load 126. In some embodiments, but not all embodiments, the generator 116 may be isolated or disconnected from the prime mover 114. The controller 104 may trigger the shut down or isolation as soon as the operating condition is determined to be pole-slip or after an elapsed period of time.

In general, the foregoing disclosure finds utility in various applications relating to stationary power generation and power generation for vehicles, machines and/or tools employing gensets 102. More specifically, the disclosed systems and methods may be used to provide robust monitoring and protection of gensets 102 and their load(s) 126 to minimize the adverse effects associated with pole-slip on such gensets 102 and load(s) 126.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for detecting a pole slip condition in a generator of a genset, the system comprising:
   the generator comprising a stator and a rotor rotatably disposed within the stator, the generator configured to rotate a rotor magnetic field in the stator and to generate a stator magnetic field when the stator is electrically coupled to a load; and
   a prime mover including an output shaft operably connected to the rotor of the generator, the prime mover configured to drive rotation of the rotor; and
   a controller in operable communication with the genset, the controller configured to:
      determine via a displacement sensor a mechanical status based on data associated with a translational displacement of the rotor;
      determine an electrical status based on (a) a load angle or (b) the load angle and a rate of change of the load angle associated with rotation of the rotor in the stator;
      determine an operating condition of the generator based on fusion of the mechanical status and the electrical status;
      activate an output member to display or emit a warning if the operating condition is a pole-slip-warning; and
      activate a protective action if the operating condition is a pole-slip.

2. The system of claim 1, wherein the translational displacement includes a horizontal displacement of the rotor along a x-axis, and a vertical displacement of the rotor along a y-axis.

3. The system of claim 1, in which the controller is further configured to:
   if the mechanical status is a mechanical-pole-slip-warning and the electrical status is an electrical-no-pole-slip, determine the operating condition of no-pole-slip for the generator; and
   if the mechanical status is a mechanical-pole-slip and the electrical status is the electrical-no-pole-slip, determine the operating condition of pole-slip-warning for the generator.

4. The system of claim 1, in which the controller is further configured to:
   if the mechanical status is a mechanical-no-pole-slip and the electrical status is an electrical-pole-slip-warning, determine the operating condition of no-pole-slip for the generator;
   if the mechanical status is a mechanical-pole-slip-warning and the electrical status is the electrical-pole-slip-warning, determine the operating condition of pole-slip-warning for the generator; and
   if the mechanical status is a mechanical-pole-slip and the electrical status is the electrical-pole-slip-warning, determine the operating condition of pole-slip for the generator.

5. The system of claim 1, in which the controller is further configured to:
   if the mechanical status is a mechanical-no-pole-slip and the electrical status is an electrical-pole-slip, determine the operating condition of no-pole-slip for the generator;
   if the mechanical status is a mechanical-pole-slip-warning and the electrical status is the electrical-pole-slip, determine the operating condition of pole-slip-warning for the generator; and
   if the mechanical status is a mechanical-pole-slip and electrical status is the electrical-pole-slip, determine the operating condition of pole-slip for the generator.

6. A method for protecting a genset from pole slip, the genset comprising a prime mover and a generator, the prime mover including an output shaft operably connected to a rotor of the generator, the prime mover configured to drive rotation of the rotor, the generator including a stator and the rotor rotatably disposed within the stator, the stator electrically coupled to a load, the generator configured to rotate a rotor magnetic field in the stator and to generate a stator magnetic field, the method comprising:
   determining, by a controller in operable communication with the genset, a mechanical status of the generator based on data associated with translational displacement of the rotor;
   calculating, by the controller, a load angle and a rate of change of the load angle associated with rotation of the rotor in the stator;
   determining, by the controller, an electrical status of the generator based on (a) the load angle or (b) the load angle and the rate of change of the load angle;
   determining, by the controller, an operating condition of the generator based on fusion of the mechanical status and the electrical status;
   if the operating condition is a pole-slip-warning, activating, by the controller, an output member to display or emit a warning; and
   if the operating condition is a pole-slip, activating, by the controller, a protective action.

7. The method according to claim 6, wherein the translational displacement includes a horizontal displacement of the rotor along an x-axis, and a vertical displacement of the rotor along a y-axis.

8. The method according to claim 7, wherein the translational displacement further includes a displacement of the rotor along a z-axis.

9. The method according to claim 8 further comprising calculating a resultant displacement based on the translational displacement, wherein the mechanical status is determined using the resultant displacement.

10. The method according to claim 6 further comprising:
    if the mechanical status is a mechanical-pole-slip-warning and the electrical status is an electrical-no-pole-slip, determining, by a controller in operable communication with the genset, the operating condition of no-pole-slip for the generator; and
    if the mechanical status is a mechanical-pole-slip and the electrical status is the electrical-no-pole-slip, determining, by the controller, the operating condition of pole-slip-warning for the generator.

11. The method according to claim 6 further comprising:
if the mechanical status is a mechanical-no-pole-slip and the electrical status is an electrical-pole-slip-warning, determining, by a controller in operable communication with the genset, the operating condition of no-pole-slip for the generator;
if the mechanical status is a mechanical-pole-slip-warning and the electrical status is the electrical-pole-slip-warning, determining, by the controller, the operating condition of pole-slip-warning for the generator; and
if the mechanical status is a mechanical-pole-slip and the electrical status is the electrical-pole-slip-warning, determining, by the controller, the operating condition of pole-slip for the generator.

12. The method according to claim 6 further comprising:
if the mechanical status is a mechanical-no-pole-slip and the electrical status is an electrical-pole-slip, determining, by a controller in operable communication with the genset, the operating condition of no-pole-slip for the generator;
if the mechanical status is a mechanical-pole-slip-warning and the electrical status is the electrical-pole-slip, determining, by the controller, the operating condition of pole-slip-warning for the generator; and
if the mechanical status is a mechanical-pole-slip and electrical status is the electrical-pole-slip, determining, by the controller, the operating condition of pole-slip for the generator.

13. The method according to claim 6, wherein the protective action is shutting down the generator or genset.

14. The method according to claim 6, wherein the protective action is isolating the generator from the load.

15. A system comprising:
a genset including:
a generator that includes a stator and a rotor rotatably disposed within the stator, the generator configured to rotate a rotor magnetic field in the stator and to generate a stator magnetic field when the stator is electrically coupled to a load; and
a prime mover including an output shaft operably connected to the rotor of the generator, the prime mover configured to drive rotation of the rotor; and
a controller in operable communication with the genset, the controller configured to:
calculate a resultant displacement based on data associated with a translational displacement of the rotor;
determine a mechanical status of the generator based on the resultant displacement;
calculate a load angle and a rate of change of the load angle associated with rotation of the rotor in the stator;
determine an electrical status of the generator based on (a) the load angle or (b) the load angle and the rate of change of the load angle;
determine an operating condition of the generator based on fusion of the mechanical status and the electrical status;
if the operating condition is a pole-slip-warning, activate an output member to display or emit a warning; and
if the operating condition is a pole-slip, activate a protective action.

16. The system of claim 15, in which the controller is further configured to:
determine the mechanical status is mechanical-pole-slip when the resultant displacement is greater than a displacement threshold;
determine the mechanical status is pole-slip-warning when the resultant displacement is (a) less than or equal to the displacement threshold and (b) greater than a displacement warning threshold; and
determine the mechanical status is no-pole-slip when the resultant displacement is equal to or less than the displacement warning threshold.

17. The system of claim 15, in which the controller is further configured to:
determine the electrical status is electrical-pole-slip when the load angle is greater than a load angle threshold;
determine the electrical status is electrical pole-slip when (a) the load angle is less than or equal to the load angle threshold and greater than the load angle warning threshold and (b) the rate of change of the load angle is greater than a change rate threshold;
determine the electrical status is electrical pole-slip-warning when (a) the load angle is less than or equal to the load angle threshold and greater than the load angle warning threshold and (b) the rate of change of the load angle is less than or equal to the change rate threshold; and
determine the electrical status is electrical no-pole-slip when the load angle is equal to or less than a load angle warning threshold.

18. The system of claim 15, wherein the translational displacement includes a horizontal displacement of the rotor along an x-axis and a vertical displacement of the rotor along a y-axis.

19. The system of claim 18 further comprising a displacement sensor in operable communication with the controller, the displacement sensor configured to measure data associated with the translational displacement of the rotor, the displacement sensor disposed on the stator adjacent to (a) a rear end or (b) a front end of the generator.

20. The system of claim 18, wherein the translational displacement further includes a displacement along a z-axis.

* * * * *